Patented June 27, 1933

1,916,041

UNITED STATES PATENT OFFICE

HENRY DREYFUS, OF LONDON, ENGLAND

MANUFACTURE OF OXYGENATED ORGANIC COMPOUNDS

No Drawing. Original application filed May 21, 1924, Serial No. 714,981, and in Great Britain May 21, 1924. Divided and this application filed April 5, 1928. Serial No. 267,809.

This application is a division from my application S. No. 714,981 now Patent No. 1,704,965.

This invention relates to the manufacture of acetic acid, acetaldehyde, or acetone or mixtures containing the same.

According to the invention a mixture containing methane and carbon dioxide or carbon monoxide or both oxides, is passed under pressure over or in contact with a heated catalyst or catalysts capable of effecting or promoting combination between the methane and the oxide or oxides of carbon to form the acetaldehyde, acetic acid, acetone or mixtures of any of them, the reaction being performed below about 500° C.

I may for example employ metals which are catalysts for or tend to promote the reaction, for example copper, iron, nickel, cobalt, palladium, platinum, palladium black or platinum black, (all hereinafter included in the term metallic hydrogenation catalyst) or any other suitable metallic or other compounds may be employed which are catalysts for or tend to promote the reaction. Or suitable mixtures of metals and metallic or other compounds may be employed.

I may likewise employ for the invention catalytic material consisting of or comprising nickel carbonate or other carbonates of metals which usually dissociate at temperatures between about 100° and about 500° C., with formation of oxide of the metal and evolution of carbon dioxide. It is found that such carbonates effect or assist the reaction catalytically, perhaps owing to their assuming a labile phase or undergoing rapidly alternating decarbonation and carbonation when heated in the presence of the mixture of methane and carbon dioxide or carbon monoxide or both. The metals, whose carbonates are used as catalysts, may or may not themselves be catalysts for the reaction.

The carbonate may be mixed or associated with metallic nickel or other metal or metals which are catalysts for or tend to promote the reaction, for example copper, iron, nickel, cobalt, palladium, platinum, palladium black or platinum black.

It is understood that mixture of such carbonates as referred to may be employed, with or without a free catalytic or reaction promoting metal or metals. Other carbonates, such as sodium carbonate, may likewise be employed in association with the carbonate or carbonates such as before referred to, with or without free catalytic or reaction-promoting metal or metals.

It is further understood that I do not confine myself to the particular catalytic or reaction-promoting materials specified and that I may use any others suitable for the purpose.

In carrying out the invention the carbon dioxide or monoxide or mixture of carbon dioxide and monoxide will usually, though not necessarily, be employed in excess relatively to the methane, and the reaction will preferably be conducted at a temperature above the distilling point of the aliphatic compound or compounds formed.

The catalytic material may be employed in any suitable or convenient form, whether deposited on porous materials, or as wire, gauze or in other finely divided state or otherwise. Or the catalytic or reaction-promoting metal or material may itself form partly or entirely the tubes, chambers or apparatus in which the reaction takes place, with or without employment of catalytic or reaction promoting material in the interior thereof. For instance, iron tubes or reaction chambers may themselves serve as the catalytic or reaction-promoting material.

The operation may be carried out in tubes, pipes, chambers or any other suitable form of apparatus. It is conducted under pressure, which may for example be between five and 100 atmospheres or more.

The rate of passage of the mixed gases over the catalytic or reaction-promoting material depends upon the temperature and pressure. The higher the temperature and the higher the pressure the quicker the speed of passage of the gases.

The operation may be conducted as a continuous process by recirculating the reaction gases through the conversion chamber or chambers, and separating the desired aliphatic conversion product or products after successive passages or at other desired intervals.

The invention may be illustrated by the following examples it being understood that these are given only by way of example and can be varied widely.

A mixture of methane with an excess of carbon monoxide over the molecular proportion theoretically required for the production of acetaldehyde, e. g. an excess of about 10 to 20% of CO, is passed under a pressure of about 12 to 50 atmospheres, at a temperature of about 150–300° C. through pipes or chambers filled with or containing the catalytic or reaction-promoting material e. g. finely divided iron, or nickel carbonate, the latter preferably mixed with finely divided nickel. The speed of passage of the gases varies with the temperature and pressure. At 12 to 50 atmospheres and 150–300° C. for example, a mixture of methane with carbon monoxide in an excess of 10–20% of CO over the amount theoretically necessary for the formation of acetaldehyde, may be passed over the catalyst at a rate of about 5 to 20 litres per minute of the gas mixture per 200 cubic centimetres of the catalyst. The mixture of gas and vapour resulting is led to apparatus for separating the acetaldehyde or mixture of aldehyde and other aliphatic compounds formed, and the residual methane and carbon monoxide are recirculated through the conversion chambers, as a continuous process, further additions of methane and carbon monoxide being made at intervals as required.

As another example a mixture of methane with an excess of carbon dioxide over the molecular proportion theoretically required for the production of acetic acid, e. g. an excess of about 20%, is passed under pressure, e. g. about 12 to 50 atmospheres, through pipes or chambers filled with or containing the catalytic or reaction-promoting material, e. g. finely divided iron, or nickel carbonate, the latter preferably mixed with finely divided nickel or iron, at a temperature above the boiling point of acetic acid, e. g. between about 120° and 300° C. The speed of passage of the gases varies with the temperature and pressure. At 10 to 50 atmospheres and temperatures between 120° and 300° for example a mixture of methane with carbon dioxide in an excess of about 20% of $CO_2$ over the amount theoretically necessary for the formation of acetic acid, may be passed over the catalyst at a rate of about 5 to 20 litres per minute of the gas mixture per 200 cubic centimetres of the catalyst. The mixture of gas and vapour resulting is led on to apparatus for separating the acetic acid or mixture of acetic acid and other aliphatic compounds formed, and the residual methane and carbon dioxide are recirculated through the conversion chambers as a continuous process, further additions of methane and carbon dioxide being made at intervals as required.

Mixtures of both carbon monoxide and carbon dioxide with methane may be similarly employed.

It is understood that while an excess of carbon monoxide and carbon dioxide respectively is indicated as employed in the foregoing examples, an excess thereof may be dispensed with.

What I claim and desire to secure by Letters Patent is:—

1. Process for the production of oxidation products of ethanol comprising passing a mixture comprising methane and an oxide of carbon under super-atmospheric pressure in contact with heated catalytic material comprising a metal carbonate having the property of dissociating between 100° and 500° C.

2. Process for the production of oxidation products of ethanol comprising passing a mixture comprising methane and an oxide of carbon under super-atmospheric pressure in contact with heated catalytic material comprising sodium carbonate and a carbonate of a metal other than an alkali metal, the latter carbonate having the property of dissociating between 100° and 500° C.

3. Process for the production of oxidation products of ethanol comprising passing a mixture comprising methane and an oxide of carbon under super-atmospheric pressure in contact with heated catalytic material comprising a metal carbonate having the property of dissociating between 100° and 500° C. the reaction being performed between 120° and 300° C.

4. Process for the production of oxidation products of ethanol comprising passing a mixture comprising methane and an oxide of carbon under super-atmospheric pressure in contact with heated catalytic material comprising a metallic hydrogenation catalyst associated with a metal carbonate having the property of dissociating between 100° and 500° C.

5. Process for the production of oxidation products of ethanol comprising passing a mixture comprising methane and an oxide of carbon under super-atmospheric pressure in contact with heated catalytic material comprising a metallic hydrogenation catalyst associated with sodium carbonate and a carbonate of a metal other than an alkali metal, the latter carbonate having the property of dissociating between 100° and 500° C.

6. Process for the production of acetic acid comprising passing a mixture comprising methane and carbon dioxide under superatmospheric pressure in contact with heated catalytic material comprising a metal carbonate having the property of dissociating between 100° and 500° C.

7. Process for the production of acetic acid comprising passing a mixture comprising methane and carbon dioxide under super-atmospheric pressure in contact with heated catalytic material comprising a metal carbonate having the property of dissociating between 100° and 500° C., the carbon dioxide being employed in excess relatively to the methane.

8. Process for the production of acetic acid comprising passing a mixture comprising methane and carbon dioxide under superatmospheric pressure in contact with heated catalytic material comprising sodium carbonate and a carbonate of a metal other than an alkali metal, the latter carbonate having the property of dissociating between 100° and 500° C.

9. Process for the production of acetic acid comprising passing a mixture comprising methane and carbon dioxide under superatmospheric pressure in contact with heated catalytic material comprising a metal carbonate having the property of dissociating between 100° and 500° C., the reaction being performed between 120° and 300° C.

10. Process for the production of acetic acid comprising passing a mixture comprising methane and carbon dioxide under superatmospheric pressure in contact with heated catalytic material comprising a metal carbonate having the property of dissociating between 100° and 500° C., the reaction being performed between 120° and 300° C., and the carbon dioxide being employed in molecular excess relatively to the methane.

11. Process for the production of acetic acid comprising passing a mixture including methane and carbon dioxide under superatmospheric pressure in contact with heated catalytic material comprising a metallic hydrogenation catalyst associated with a metal carbonate having the property of dissociating between 100° and 500° C.

12. Process for the production of acetic acid comprising passing a mixture including methane and carbon dioxide under superatmospheric pressure in contact with heated catalytic material comprising a metallic hydrogenation catalyst associated with sodium carbonate and with a carbonate of a metal other than an alkali metal, the latter carbonate having the property of dissociating between 100° and 500° C.

13. Process for the production of acetic acid comprising passing a mixture including methane and carbon dioxide under superatmospheric pressure in contact with heated catalytic material comprising a metallic hydrogenation catalyst and a metal carbonate having the property of dissociating between 100° and 500° C., the reaction being performed between 120° and 300° C.

14. Process for the production of acetic acid comprising passing a mixture including methane and carbon dioxide under superatmospheric pressure in contact with heated catalytic material comprising sodium carbonate and a carbonate of a metal other than an alkali metal, the latter carbonate having the property of dissociating between 100° and 500° C., the reaction being performed between 120° and 300° C.

15. Process of producing aliphatic compounds which comprises passing a mixture of methane and at least one oxide of carbon under super-atmospheric pressure in contact with a heated catalytic material comprising a metal carbonate having the property of dissociating between 100° and 500° C.

16. Process of manufacturing aliphatic compounds which comprises passing a mixture of methane and carbon monoxide under super-atmospheric pressure in contact with a heated catalytic material comprising a metal carbonate having the property of dissociating between 100° and 500° C.

In testimony whereof I have hereunto subscribed my name.

HENRY DREYFUS.